April 14, 1931.  H. C. LITTLE  1,800,649
FREEZER
Filed Feb. 6, 1929
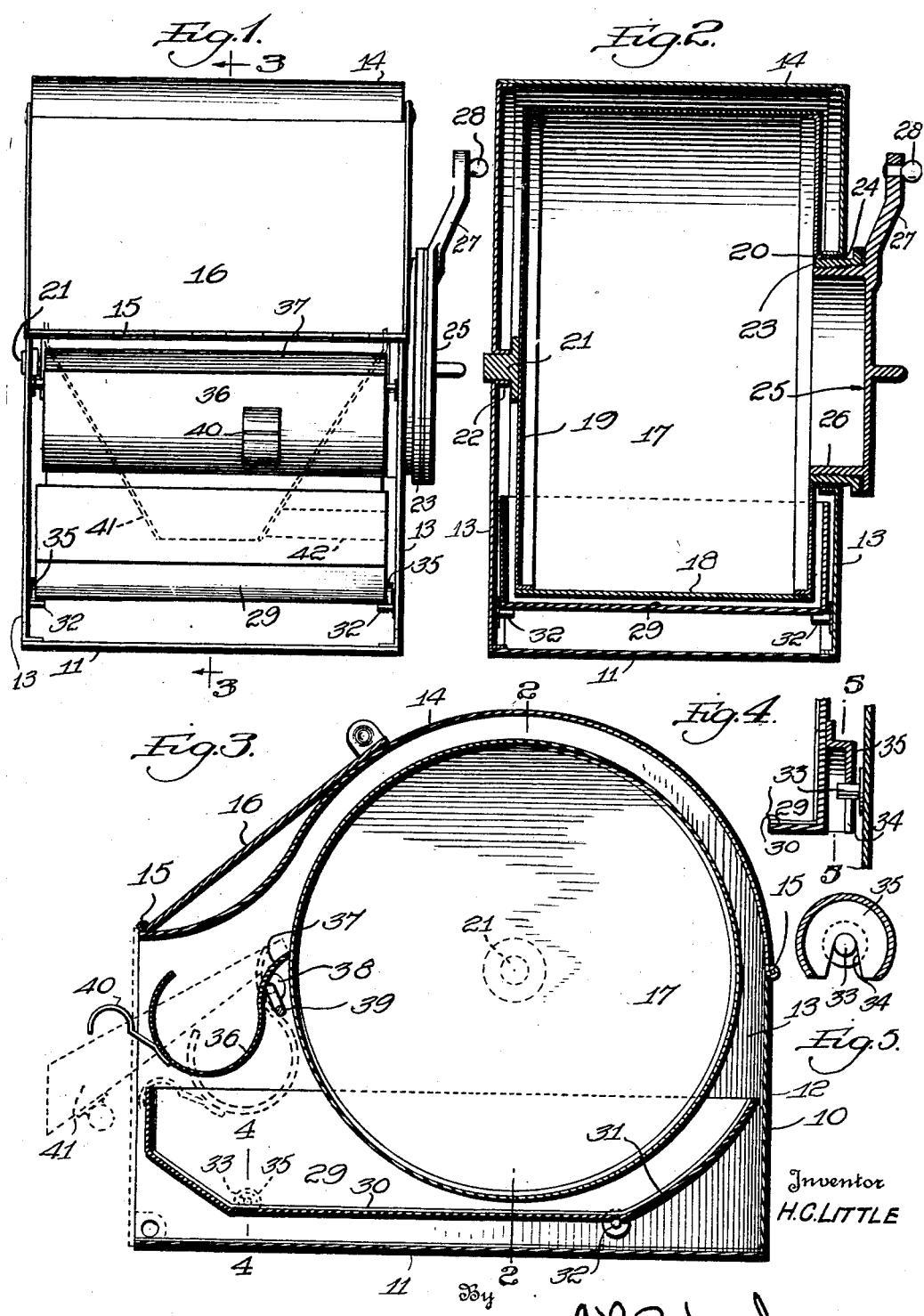

Patented Apr. 14, 1931

1,800,649

UNITED STATES PATENT OFFICE

HARRY C. LITTLE, OF SAN FRANCISCO, CALIFORNIA

FREEZER

Application filed February 6, 1929. Serial No. 337,981.

My invention relates to improvements in external freezers, wherein the refrigerant is held within a rotatable holder, and the liquid food product is collected upon the periphery of the rotatable holder and frozen thereon, and scraped or otherwise removed from the same.

In accordance with my invention, a casing is provided, and a rotatable refrigerant holder is mounted within the casing. A pan to hold the liquid food product to be frozen is removably mounted within the lower portion of the casing, beneath the refrigerant holder. The refrigerant holder projects into the pan in order that it may take up the liquid food product, and this renders it difficult to remove the liquid food product holding pan, without dismantling the machine. When it is desired to change the character or flavor of the liquid food product, it is necessary to remove the pan, and this frequently occurs. In machines of this general character, as heretofore constructed, the inability to remove the liquid food product holding pan, without dismantling the machine, or removing parts thereof, has been a serious objection to their use. I so construct the pan, and so mount the same within the lower portion of the casing, that it coacts with the refrigerant holder, in a manner to permit of the ready removal of the pan. The apparatus further provides a trough having a scraping element to remove the layer or film of frozen food product from the revolving refrigerant holder, and this trough is located above the pan, and is adapted to enter the pan during the manipulation of the pan, to effect its removal. While the trough is removable, yet the pan may be removed without even removing the trough. The trough is foldable downwardly into the end of the pan, permitting of the closing movement of a door to cover the open side of the casing, thereby completely closing the casing when the apparatus is not in operation during the scraping of the frozen food product from the refrigerant holder. The downward folding movement of the trough brings the same into a lower position, whereby it is retained cold.

In the accompanying drawings, forming a part of this specification, and in which like numerals are employed to designate like parts throughout the same, Figure 1 is a front end elevation of a freezer embodying my invention, Figure 2 is a transverse section taken on line 2—2 of Figure 3, Figure 3 is a vertical longitudinal section taken on line 3—3 of Figure 1, Figure 4 is a detailed section taken on line 4—4 of Figure 3, and, Figure 5 is a detailed section taken on line 5—5 of Figure 4.

In the drawings, wherein for the purpose of illustration, is shown a preferred embodiment of my invention, the numeral 10 designates a casing, preferably formed of metal and embodying a bottom 11, a back 12, and sides 13. The upper portion of the sides extend above the back 12 and have their upper edges curved, as shown, to engage with a swinging top or cover 14, hinged at 15'. The top or cover 14, at its forward end, has a hinged connection 15 with a front end cover 16, adapted to be folded downwardly to close the open front end of the casing 10, whereby the casing may be completely closed.

The numeral 17 designates a cylindrical refrigerant holder or drum, having a periphery 18 and heads or ends 19 and 20. The head 19 carries a trunnion 21, rigidly attached thereto, journaled in a bearing 22, formed in one side 13. The head 20 is provided with a relatively large central opening, within which is mounted a ring 23, rigidly secured therein. The refrigerant such as ice, is fed into the refrigerant holder through this ring, and the ring is rotatably mounted within a large opening 24, formed in the side 13. The numeral 25 designates a plug or cap, having an annular flange 26, having screw-threaded engagement within the ring 23, the screw-threads being left hand threads. The cap 25 carries a radial arm or crank 27, which may be equipped with a knob or handle 28.

Mounted within the lower portion of the casing 10 is a liquid food holding pan 29, having a straight horizontal bottom 30 extending throughout the major portion of its length and a curved rear end wall 31, which is is generally concentric with the periphery of the refrigerant holder 17. The rear end of the bottom 30 rests upon horizontal inwardly projecting trunnions 32, while the forward end of the pan is supported by inwardly projecting trunnions 33, attached to the sides 13 and adapted for insertion within notches 34, formed in brackets 35, attached to the sides of the pan 29, near its bottom, as shown. When the pan is supported in the horizontal position, Figure 3, the trunnions 33, entering the notches 34, co-act with the trunnions 32, to not only retain the pan elevated but to lock it against longitudinal displacement. By raising the forward end of the pan 29, until the trunnions 33 clear the notches 34, the pan may be removed forwardly from within the casing 10.

As the pan is shifted forwardly, the inclined or curved end 31, travels upon the trunnion 32 and the pan is lowered, and the curved end 31 will clear the periphery of the refrigerant holder 17, as it is approximately concentric with relation thereto. The pan may, therefore, be worked or manipulated so that it may be moved from beneath the holder 17, without the necessity of disturbing or removing the holder.

The numeral 36 designates a trough, having an inner extension 37, serving as a scraper, to remove the frozen food from the periphery of the refrigerant holder. The trough is provided with lugs 38, arranged upon the lower side thereof, and attached thereto, and these lugs engage over a stationary transverse rod 39. A handle 40 is attached to the trough 36, by means of which the trough may be turned transversely upon the rod 39. The trough may be raised by means of the handle, so that the scraper 37 will be brought closer to the periphery of the drum 17, or the trough may be swung downwardly into the pan 29, since its length is less than the width of the trough, and when in this position, the hooked end of the handle 40 will rest upon the end of the pan 29, and this will permit the end cover 16 being swung to the closed position, thereby completely enclosing the refrigerant holder and pan, when the machine is not in operation, for maintaining the maximum sanitary conditions. Further, since the trough 36 may enter the pan 29, the pan 29 may be removed without even removing the trough 36.

I may use a modified form of trough and scraper, which I have indicated in dotted lines at 41, and this trough and scraper may rest upon the rod 39, and is equipped with a handle 42, whereby it may be manipulated.

In the operation of the freezer, the fluid food is placed within the pan 29, and the refrigerant held within the cylindrical holder 17. This holder is turned to the left or counter-clockwise, Figure 3. When a coating or film of the fluid food freezes upon the periphery of the holder 17, it is scraped from the same by the operator moving the scraper 37 sufficiently close to the revolving holder. The frozen food thus removed is collected in the trough 36. When the machine is not in operation, the trough 36 may be lowered or folded into the pan 29 and the hook 40 will rest upon the forward end of the pan, as shown. This will permit the end cover 16 being shifted to the closed position.

The pan 29 may be removed from and placed within the bottom of the casing, without removing or disturbing the refrigerant holder 17 or the trough 36, as explained.

It is to be understood that the form of my invention, herewith shown and described, is to be taken as a preferred example of the same, and that various changes in the shape, size and arrangement of parts, may be resorted to without departing from the spirit of my invention, or the scope of the subjoined claim.

Having thus described my invention, I claim:—

An external freezer for liquid foods, comprising a casing having an opening in one side, a substantially cylindrical refrigerant holder mounted within the casing, a pan arranged within the lower portion of the casing with the lower portion of the holder extending into the pan for a substantial distance below the top of the pan, the end of the pan remote from said opening being curved in cross-section and generally concentric with the holder, trunnions mounted within the casing and engaging the pan to support the same near its ends and retaining the pan spaced from the bottom of the casing, the trunnions arranged nearest to said opening having detachable interlocking engagement with the pan, while the trunnions remote from said opening are in free engagement with the pan, the bottom of the pan between the trunnions being unsupported whereby the curved end of the pan may descend to the bottom of the casing between the trunnions thus enabling the pan to be removed through said opening without removing or disturbing said holder, and means to remove the frozen food from said holder.

In testimony whereof I affix my signature.
HARRY C. LITTLE.